Jan. 13, 1959

A. L. KETCHUM 2,868,983

ULTRA-HIGH FREQUENCY STRUCTURES

Filed May 5, 1954

INVENTOR.
Arthur L. Ketchum
BY
J. D. Douglas
ATTORNEY

United States Patent Office 2,868,983
Patented Jan. 13, 1959

2,868,983

ULTRA-HIGH FREQUENCY STRUCTURES

Arthur Lee Ketchum, Park Ridge, Ill., assignor to Admiral Corporation, Chicago, Ill., a corporation of Delaware Application May 5, 1954, Serial No. 427,737

4 Claims. (Cl. 250—40)

The invention relates to ultra-high frequency structures and more particularly, but not exclusively, to resonant circuits or structures for ultra-high frequency signals.

Commercial use of frequencies between 500 and 1,000 mc. for the transmission of television signals has created a need for an efficient but economical tuned circuit within the ultra-high frequency range. The selective network of the converter section of an ultra-high frequency receiver to be efficient must present as low an attenuation as possible to the desired signal and high attenuation to other signals. In addition, the selective network must be tunable over a relatively wide range of frequencies in the ultra-high frequency portion of the frequency spectrum. To be economical, the tuned circuit of the selective network is limited to lumped inductance and capacitance circuits.

There are, in the prior art, structures which can be utilized in the very high frequency range. Some of these structures comprise a hollow insulative form, which performs two functions. One of these functions is to provide a dielectric for a capacitor, the plates of which are positioned on both sides of the wall of the hollow form. The second function of the form is to provide a support for the inductor of the tuned circuit.

These structures, however, are subject to attenuation, due to power losses, and to stray capacitance within the inductor of the tuned circuit. A substantial part of the power loss is often produced within the dielectric material upon which the inductor is wound, especially if such dielectric material has a high power factor, as is often the case. The presence of stray capacitance within the inductor, which attenuates the signal appearing across the inductor, increases if wound upon an insulative form having a high dielectric material, which is sometimes the case. Both of the above factors tend to become aggravated as the frequency of the signal being employed increases, so that serious attenuation occurs when used with signals in the ultra-high frequency range.

It is, therefore, an object of this invention to provide an improved resonant structure capable of operating in the ultra-high frequency range.

Another object is the provision of an economical tuned resonant structure having a relatively high efficiency.

A further object of the invention is to provide a tuned resonant structure having a high Q for increased selectivity and low power loss.

Still another object is to provide an improved resonant structure tunable over the ultra-high frequency range.

Other objects and many of the attendant advantages of this invention will be readily appreciated as the same becomes better understood by reference to the following detailed description when considered in connection with the accompanying drawings in which.

Figure 1:
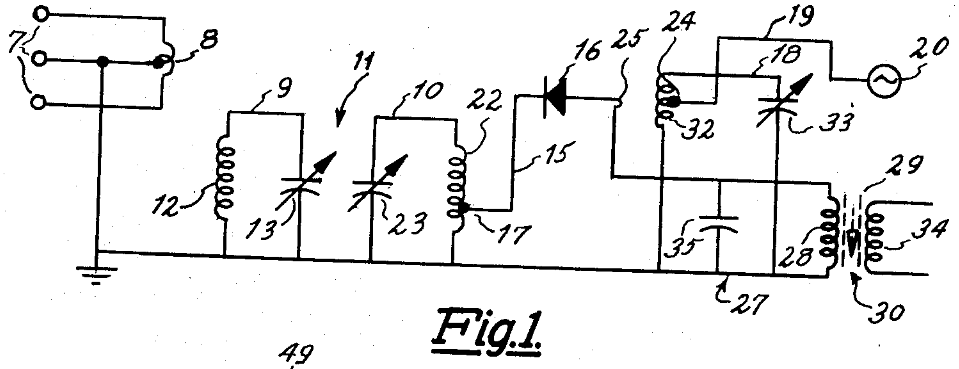
Fig. 1 shows a circuit diagram of a converter section of an ultra-high frequency receiver.
Figure 3:
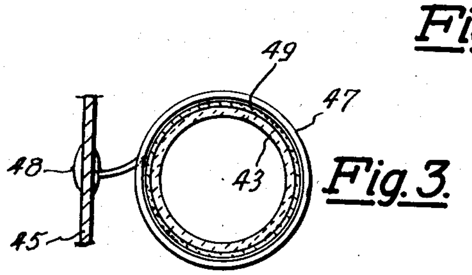
Fig. 3 illustrates a section of the tuned resonant structure of Fig. 2 taken on the line 3—3 of Fig. 2.
Figure 5:
Fig. 5 is a cross section of the coil wire shown in Fig. 4.

Referring now to the drawings, wherein like reference characters designate like or corresponding parts throughout the several views, there is shown in Fig. 1 a portion of an ultra-high frequency superheterodyne receiver, i. e. converter section, comprising one form of apparatus in which the invention is particularly adapted. The tuned resonant structures of the invention comprise the selective networks in the converter circuit to provide selectivity for the desired band of frequencies in the ultra-high frequency spectrum.

The ultra-high frequency energy supplied to the input terminals 7 by an antenna is inductively coupled from the primary circuits, including the R. F. coupling coil 8, to the secondary resonant circuit comprising the double tuned selective network 11. Band pass filtering action is obtained in the network 11 composed of parallel resonant circuits 9 and 10 which may be tuned to include a band of carrier frequencies e. g. 6 mc. wide for television signal channels.

The double tuned resonant circuits 9 and 10 are individually tuned to the same frequency having a degree of overcoupling to provide the desired band width. A separation in peaks in the response curves due to overcoupling for the tuned circuits 9 and 10 would give a band width of approximately 6 mc., which would be desirable for separation of television signals of a single channel. Each of the tuned circuits 9 and 10 comprises a coil and variable tuning capacitor wherein the respective capacitor is varied to select the same desired resonant frequency for each tuned circuit.

The selected band of frequencies from the double tuned circuit is transferred to the output load, crystal mixer or converter 16, wherein the input impedance of the crystal 16 is matched by the portion of coil 22 taken at tap 17. Crystal converter 16 mixes the selected band of ultra-high frequency signals with a local source of ultra-high frequency signals from harmonic generator 20 through lead 19 at tap 24 of coil 32 inductively coupled to the input coil 25 of converter 16. Tuned circuit 18 comprises a harmonic selector circuit tuned to a harmonic of the local oscillator and supplied by generator 20. The mixing of the harmonic generator signal and the received ultra-high frequency signal in the crystal 16 converts the received signal to the intermediate frequency signal of a receiver.

The intermediate frequency is selected in the input tuned resonant circuit 27 of intermediate frequency coupling transformer 30 having a primary coupling coil 28 and condenser 35 in parallel therewith. The transformer is adjusted to the intermediate frequency by suitable tuning means such as a slug tuning element 29. The intermediate frequency energy is transferred to the output load, e. g. intermediate frequency amplifier stages, not shown, by the secondary transformer output coupling coil 34.

Figure 2:
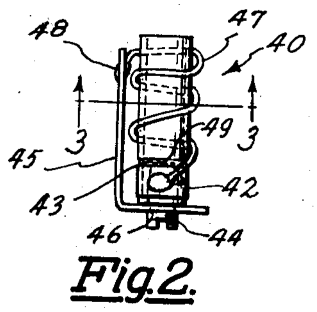
Fig. 2 shows the tuned resonant structure of the invention.

One form of the invention is illustrated in Fig. 2 in which the condenser plate or band 42 of conductive foil, such as silver, is placed around the outer surface of a hollow cylinder or form 43 of an insulating material such as a high dielectric constant ceramic, and comprises one plate of the variable tuning capacitor. In order to minimize induced currents therein the band 42 is not a complete loop. A tuning element or core 44 is disposed within the form 43 and movable therein to vary area of the core adjacent to band 42 and effectively comprises the other plate of the capacitor. The core 44 has means for adjusting and maintaining it in position within the form such as screw threads on the outer surface of the core 44. A plate or supporting bracket 45, upon which the form 43 is placed has an opening therein for receiving the threaded core 44. The supporting metal bracket 45 extends vertically along the side of the form 43 at a suitable distance from the form providing a ground for one terminal 48 of coil 47. The coil form 43 is attached to the bracket 45 with the opening 46 concentric with the hollow form 43 by cement or other means to form an integral unit.

Since capacitance is directly proportional to the area of the capacitor plates and the dielectric constant of the material between the plates and inversely proportional to the distance of the plates, a variable capacitor is provided by adjustable core member or capacitor element 44, dielectric form 43, and capacitor element or band 42.

The inductance of the tuned resonant structure 40, coil 47, comprises a single layer of bare wire wound around the dielectric form 43. Coil 47 is grounded on one end at point 48 on bracket 45 and connected to band 42 to form a closed loop through core 44 mounted in the lower portion of bracket 45. The number of turns of coil 47 depends on the L/C ratio desired for the resonant frequency chosen and may vary so long as the product of L and C is constant.

Coil 47 is separated from the outer surface of dielectric form 43 by a thin coating 49 of dielectric material interposed between the coil 47 and the form 43. This dielectric coating is selected to have characteristics of low power factor and a low dielectric constant and must be thick enough to present such characteristics to the coil 47.

The tuned resonant structure 40 requires a dielectric form which is both electrically and mechanically suitable for ultra-high frequency receiver circuits i. e. having a high dielectric constant K to provide a wide range of capacitance or a large capacitive reactance for the size of the capacitor elements and a structural composition capable of withstanding heat, mechanical stress and shock in the assembly and use of the unit. A dielectric material found to meet the requirements set out above for the tuned resonant structure 40 in the ultra-high frequency band is a ceramic known as steatite having a dielectric constant, $K \approx 8$, which is suitable both electrically and mechanically for the core structure of the invention.

Now, as discussed hereinbefore, if the bare wire 47 were wound around the form 43 so as to be in contact with the ceramic form 43, attenuation of the signal would result, due to the relatively high power factor and high dielectric constant of the ceramic form 43.

The present invention minimizes the above-mentioned attenuation by isolating the winding 47 from the high dielectric, high power factor ceramic form 43 by means of the coating 49 (Fig. 2) which is of a material having a low dielectric constant and a low power factor.

Thus, it can be seen that the structure of the invention employs but a single ceramic form which performs two functions: firstly, to provide a dielectric having a high dielectric constant for the capacitor of the tuned circuit, and secondly, to act as a support for the winding 47, while at the same time being isolated from said winding so as to produce a minimum of attenuation in the tuned circuit at ultra-high frequency levels.

The coating 49 may cover the entire form 43 except for the area covered by the capacitor band 42. A specific coating found successful in operation in reducing attenuation of ultra-high frequency signals is polystyrene which could be applied in a lacquer form by dipping the upper portion of form 43 into such a lacquer before winding the coil 47 on the form.

It is readily apparent that the coating of polystyrene effectively prevents contact of the bare wire of the coil and the ceramic while the coil form 43 retains its functional characteristic by providing a mounting for the coil. The resulting separation of the coil and ceramic substantially reduced the high gradients at the bare wire ceramic junction as evidenced by the reduction in losses in the tuned resonant circuit structure.

Figure 6:
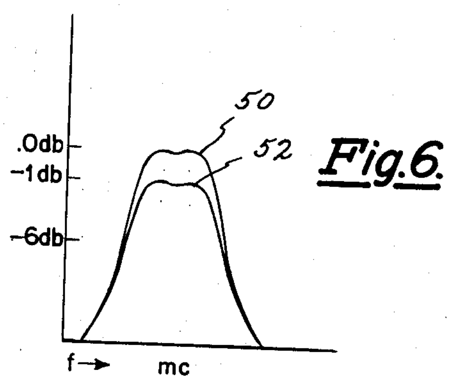
Fig. 6 is a graph of response curves comparing the response of double tuned resonant structures of the invention and conventional double tuned resonant structures.

The response curves of two band pass circuits are shown in Fig. 6 wherein curve 52 is the response curve for tuned resonant structures without separation between the bare wire of the coil and the high K ceramic form and curve 50 is the response curve for improved tuned resonant structures of the invention. The tuned resonant structures providing a separation between the coil and the ceramic show a decrease in attenuation of 1 db or 10% over the unseparated coil and ceramic tuned resonant structures. It is to be noted that the phrases "high dielectric constant," "low dielectric constant," "high power factor," and "low power factor" are used throughout the specification and in the claims. These phrases are relative and in general use each other as a point of reference. For example, the low power factor of the coating 49 is measured with respect to the relatively high power factor of the ceramic form 43 and the low dielectric constant of the coating 49 is measured with respect to the relatively high dielectric constant of the ceramic form 43.

Steatite, for example, has a dielectric constant of about 8 and a power factor of about .003, whereas polystyrene has a dielectric constant of about 2.6 and a power factor of about .0002. Thus, it can be seen, if steatite and polystyrene are used for form 43 and coating 49, respectively, the low power factor of the polystyrene will be about one-fifteenth that of the steatite, and the ratio of the dielectric constants will be about 3. Such ratios are only specific examples and merely indicate the general order of ratios involved. There is no known reason why the ratio of dielectric constants could not be 30 instead of 3, or why the ratio of power factors could not be one to three, instead of one to fifteen. The improved performance of the invention will vary, however, depending to a large extent on the magnitudes of these ratios.

Figure 4:
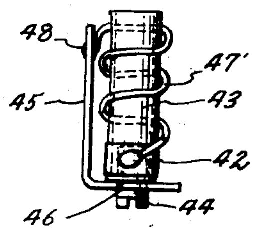
Fig. 4 shows a modification of the tuned resonant structure of the invention.

Fig. 4 illustrates another embodiment of the invention successfully employed as tuned resonant structure in the converter having a Q and decreased attenuation similar to the preferred embodiment of Fig. 2. The tuned resonant structure of Fig. 4 separates the coil 47' from the ceramic form 43' by covering or coating 53 the wire of the coil 47' with a low K dielectric having a low dissipation factor similar to the coating 49 on the ceramic form of Fig. 2. The coating 53 effectively prevents contact between the bare wire and the ceramic form whereby the attenuation is lowered due to decreased power losses and a higher Q in the tuned resonant structure. The decrease in attenuation is substantially the same as the improved structure of Fig. 2 and follows the same response curve 52 when the structure of Fig. 4 is employed in a band pass filter.

Various modifications are contemplated and may obviously be resorted to by those skilled in the art without departing from the spirit and scope of the invention, as hereinafter defined by the appended claims, as only preferred embodiments thereof have been disclosed.

I claim:

1. A resonant structure for ultra-high frequency signals comprising a hollow elongated ceramic form having a high dielectric constant, a first capacitor electrode positioned at one end only and outside of said ceramic form, a second capacitor electrode consisting of a movable core inside said form, a portion of said ceramic form as the dielectric between said first and second electrodes, coil means supported upon said ceramic form beyond said first capacitor electrode and dielectric means having a low power factor compared to the power factor of said ceramic core being interposed between said coil means and said ceramic form to separate said coil means from said ceramic form by a predetermined distance.

2. A resonant structure in accordance with claim 1, in which said dielectric means has a low dielectric constant compared to the dielectric constant of said ceramic form.

3. A resonant structure in accordance with claim 2, in which said dielectric means comprises a coating over a portion of said ceramic form lying beyond said first capacitor electrode.

4. A resonant structure in accordance with claim 2, in which said coil means comprises a conductor and in which said dielectric means comprises a coating around said conductor.

References Cited in the file of this patent

UNITED STATES PATENTS

| | | |
|---|---|---|
| 2,081,508 | Shaver | May 25, 1937 |
| 2,394,391 | Martowicz | Feb. 5, 1946 |
| 2,403,349 | Dolberg | July 2, 1946 |
| 2,502,202 | Burroughs | Mar. 28, 1950 |
| 2,503,100 | Dewhurst et al. | Apr. 4, 1950 |
| 2,544,508 | Mackey | Mar. 6, 1951 |
| 2,566,666 | Khouri et al. | Sept. 4, 1951 |
| 2,581,165 | Bonanno | Jan. 1, 1952 |
| 2,688,691 | Pan | Sept. 7, 1954 |
| 2,698,387 | Schuster | Dec. 28, 1954 |
| 2,735,072 | Versoy | Feb. 14, 1956 |

OTHER REFERENCES

Chemistry of Silicones, by Rochow (2nd edition), page 105.